United States Patent [19]
LeMay et al.

[11] Patent Number: 5,240,101
[45] Date of Patent: Aug. 31, 1993

[54] MULTIZONE UNSCRAMBLER

[75] Inventors: Curtis E. LeMay, Shelbyville; James F. Hergenrother, Rockford, both of Mich.

[73] Assignee: Rapistan Demag Corporation, Grand Rapids, Mich.

[21] Appl. No.: 877,655

[22] Filed: May 1, 1992

[51] Int. Cl.$^5$ .............................................. B65G 47/12
[52] U.S. Cl. ................................... 198/443; 198/456; 198/786
[58] Field of Search ............... 198/415, 416, 443, 456, 198/784, 786, 790

[56] References Cited

U.S. PATENT DOCUMENTS

| | | |
|---|---|---|
| 1,883,889 | 10/1932 | Farley .................................. 198/416 |
| 2,190,418 | 2/1940 | Davidson et al. ............... 198/416 X |
| 3,666,077 | 5/1972 | Marshall . |
| 4,039,074 | 8/1977 | Maxted . |
| 4,044,897 | 8/1977 | Maxted ............................ 198/786 X |
| 4,264,002 | 4/1981 | Van Der Schie ............... 198/790 X |
| 4,284,186 | 8/1981 | Brouwer . |

*Primary Examiner*—D. Glenn Dayoan
*Attorney, Agent, or Firm*—Price, Heneveld, Cooper, Dewitt & Litton

[57] ABSTRACT

A conveyor for unscrambling and discharging in single file articles received in random order and orientation from side-by-side sources, the conveyor having a plurality of rollers arranged in parallel relationship to each other, the central axes of the rollers being parallel and skewed to the side frame of the conveyor, a plurality of intermediate roller support frame members spaced from the side frame and extending lengthwise to the transport surface, aligned rollers on each side of each of the intermediate frame members being separate and independent from the rollers on the opposite side thereof, certain ones of the intermediate frame members being parallel to the side frame, the intermediate frame members dividing the article transport surface of the conveyor into a plurality of article transport zones with one of the transport zones at the article receiving end of the conveyor having a width which is a minor portion of the total width of the conveyor and means driving the rollers thereof at a higher peripheral speed than that of the rollers forming the remaining portions of article transport surface laterally thereof.

17 Claims, 4 Drawing Sheets

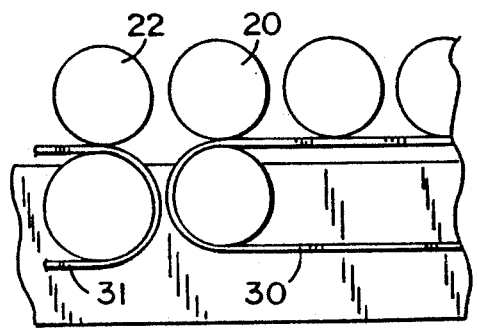
FIG. 5
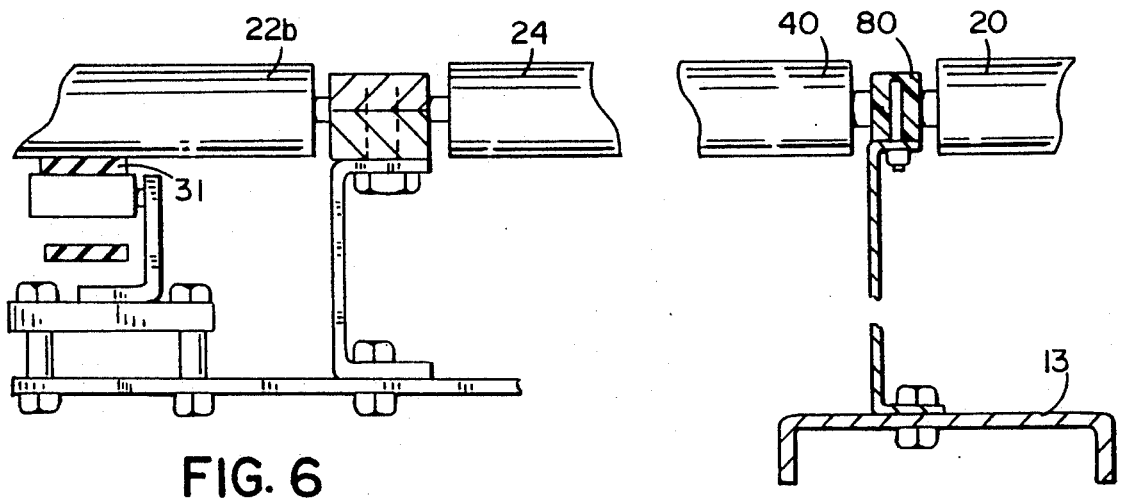
FIG. 6
FIG. 7
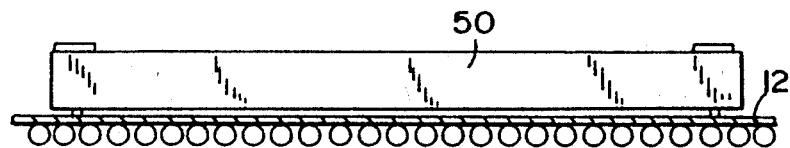
FIG. 12

MULTIZONE UNSCRAMBLER

BRIEF SUMMARY OF THE INVENTION

The invention provides an unscrambler capable of aligning a greater number of articles per unit of time even though the length of the unit has been reduced. The design also uses the entire length of the unit as an active aligning mechanism. Further, it initiates separation by multiple speed differentiation immediately upon entry of the articles onto the unit. It also provides a simplified construction which facilitates both assembly and service when the latter is necessary.

BACKGROUND OF THE INVENTION

In many conveyor systems, particularly those in large article shipping or transfer terminals, the volume of articles to be handled is increasing steadily. To accommodate this, space has been increased, mechanization has been increased and the rate at which each individual article is processed has been increased. The increased volume, if it is not to require a substantial increase in terminal area and personnel and thus unit cost of handling, has to be handled by new types of equipment capable of substantially higher operating speeds. To avoid this, each step in the process must be handled more efficiently to avoid increased handling time. To do this, the throughput of articles must be accelerated to handle the volume. This invention accomplishes this by providing an article unscrambler having a significantly increased throughput capacity. It incorporates means by which the articles can be effectively discharged in a single column at a substantially higher rate per minute without the necessity of increasing the length of the unit or it can be used to handle a somewhat lesser increase in volume with a substantially reduced unit length.

BRIEF DESCRIPTION OF THE INVENTION

The article propelling and transport surface is divided into a plurality of side-by-side lanes, each of which is separately driven at a different speed. Articles, immediately upon entry into the unit, are differentiated as to the speed at which they are moved through the unit with entry to the highest speed lane being adjacent one side of the unit with the remaining width of the unit being divided into at least two other entry lanes, each of lesser speed than the one adjacent to it and between it and said one side. These lanes ultimately merge as the discharge end is approached with the articles handled by all lanes moving to the side of the unit which is downstream of the slower lanes at the point of article entry. The articles, as they approach discharge, have been manipulated by the equipment such that all articles are moving at the same speed.

DESCRIPTION OF THE DRAWINGS

FIG. 5 is a fragmentary, sectional, elevation view taken along the plane V—V of FIG. 3;

FIG. 6 is a fragmentary, plan view of a roller support at one end of the unscrambler;

FIG. 7 is a sectional elevation view of a typical roller support at one of the side frame members;

FIG. 12 is a fragmentary side view of a modified singulating belt used when the direction of article movement over the unscrambler is reversed.

DESCRIPTION OF THE PREFERRED EMBODIMENT

Figure 4:
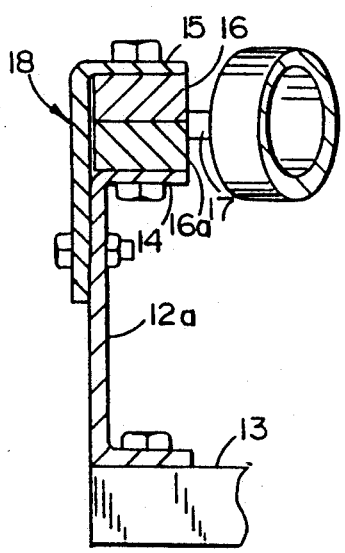
FIG. 4 is a fragmentary, sectional, elevation view taken along the plane IV—IV of FIG. 3.
Figure 2:
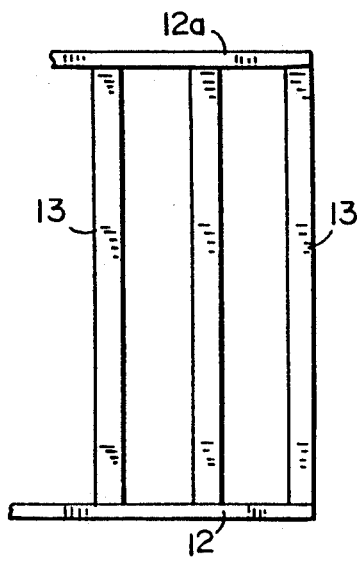
FIG. 2 is an enlarged, fragmentary, plan view of the roller support frame at the article receiving end of the unit with the article transport rollers and drive belts omitted.

The numeral 10 refers to a unit of conveyor designed to be installed in a conveyor system for unscrambling and arranging in alignment articles it receives in random and unorganized order. The conveyor has an article supporting and transport surface 11 formed by a plurality of rollers. The transport surface 11 is supported on each side by frame members 12 and 12a. These frame members are channels connected at suitable intervals by cross members 13 (FIG. 2), a construction conventionally used in conveyors. The frame members each have an inwardly extending flange 14 located below the flange 15 of the roller axle hold down member 18 (FIG. 4). Suitable bearing blocks 16 and 16a are mounted between the flange 15 of the hold down member 18 to seat and support the ends of the shafts 17 supporting the rollers.

Figure 1:
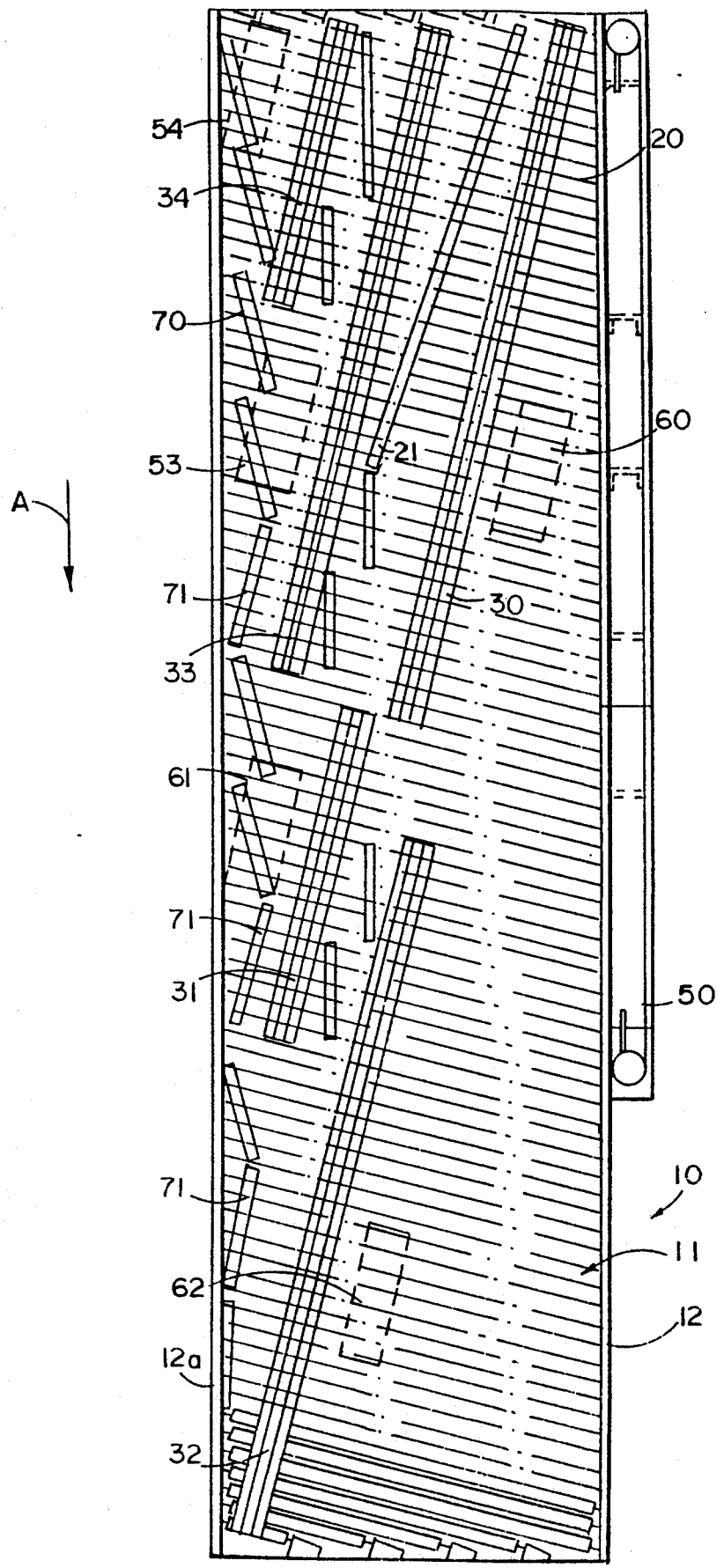
FIG. 1 is a plan view of the unscrambler with the rollers illustrated in phantom to reveal in broken lines the drive units below the article transport rollers.
Figure 8:
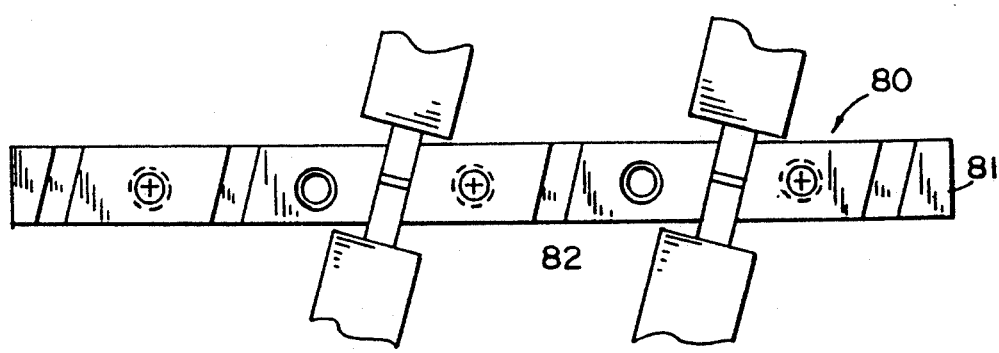
FIG. 8 is a plan view of the bottom half of a typical roller support.
Figure 9:
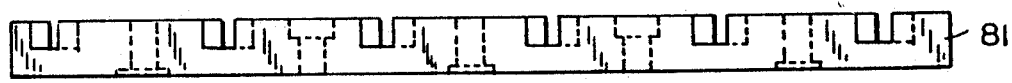
FIG. 9 is a side view of the roller support half illustrated in FIG. 8.
Figure 10:
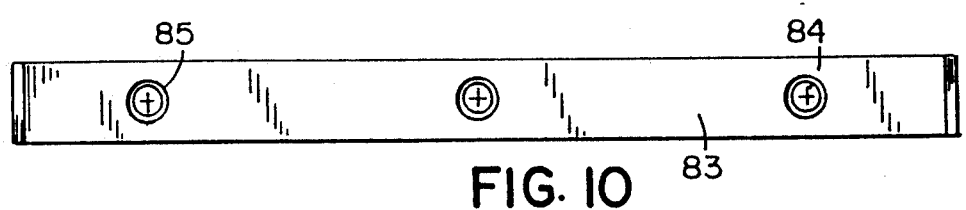
FIG. 10 is a plan view of the cap for the roller support illustrated in FIG. 8.
Figure 11:
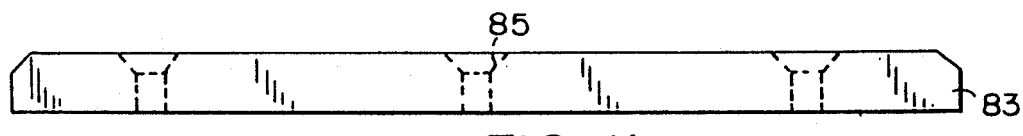
FIG. 11 is a side elevation view of the cap illustrated in FIG. 10.
Figure 3:
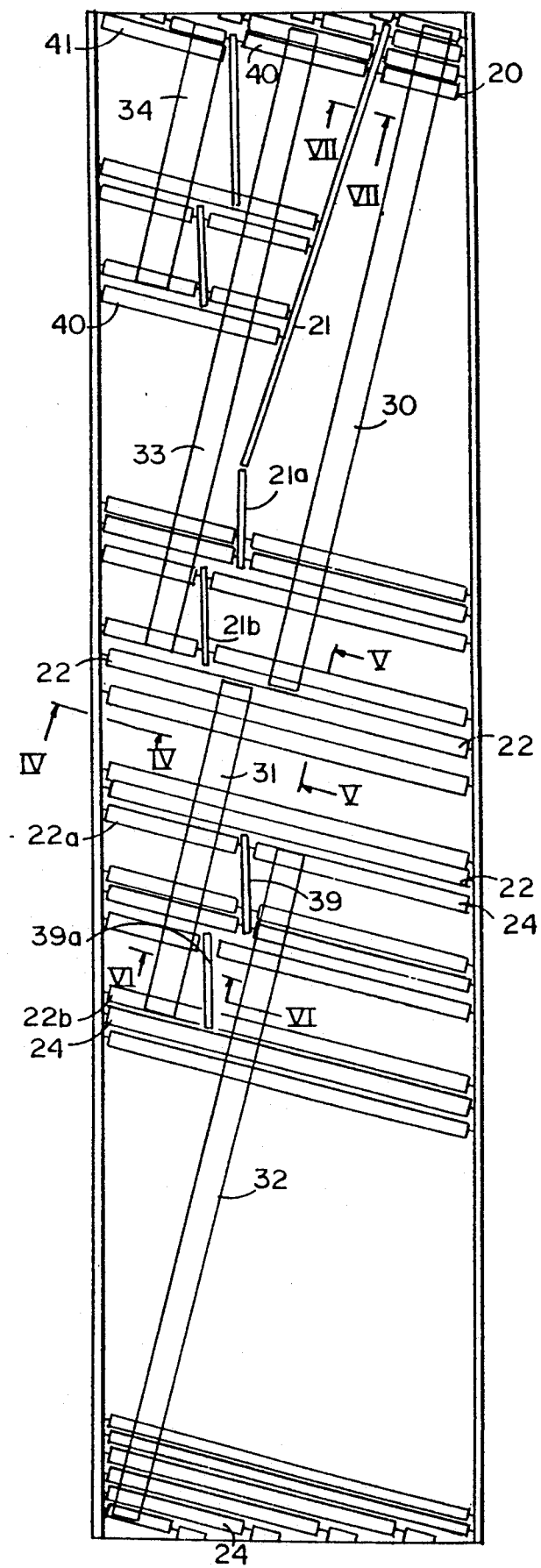
FIG. 3 is a view similar to FIG. 1 showing only those rollers at the beginning and end of each speed change zone.

The rollers which form the conveying surface of the unscrambler are arranged in groups, each driven by a separate power source at a different speed. As illustrated in FIGS. 1 and 3, the first group of rollers 20 are supported on one end by the frame member 12 and on the other end by the first intermediate roller support frame 21, including its control sections 21a and 21b (FIGS. 1 and 3). This group of rollers discharges into the second roller group 22. Articles which have passed over the roller group 22 enter the final roller group 24. The rollers in the first group 20 are driven at a speed designed to move the articles at 300 feet per minute. Rollers of second group 22 are driven at a speed also designed to transport the articles at 300 feet per minute, and rollers of group 24 are driven at a speed to transport the articles at 400 feet per minute. The speeds, as set forth, are exemplary since they may be higher or lower. However, the differentiation in speed between these groups is a basic feature of this invention.

The rollers of the roller group 20 are driven by the drive belt 30. The rollers of the roller group 22 are driven by the belt 31, and the rollers of the roller group 24 are driven by the belt 32 (FIG. 3). Each of these belts are powered by a separate prime mover supported by and beneath the frame of the unscrambler.

Articles which enter the unscrambler at that part of the conveyor surface not occupied by the roller group 20 are driven at different speeds. These rollers are separated from the rollers in roller group 20 by the roller support frames 21, 21a and 21b.

The roller groups which receive those articles which did not enter roller group 20 are divided into two article paths, the initial rollers of which operate at different speeds, both of which are less than that of the roller group 20. The rollers of roller group 40 immediately adjacent the roller group 20 and at the receiving end of the unscrambler are driven by the belt 33 at a speed less than that of the rollers 20. Those rollers ar so driven that the articles will be caused to move at 180 feet per minute. This may necessitate acceleration of the articles. The articles passing over the roller group 40 are discharged onto the rollers of the second group 22 driven by the belt 31.

The articles most remote from those entering the roller group 20 enter the roller group 41 (i.e. to the left in FIG. 3) driven by the belt 34. The belt preferably drives the rollers of group 41 at a speed designed to accelerate the articles to 85 feet per minute which prepares them to be discharged onto the rollers of roller group 40 and become merged with the articles being propelled by the belt 33. After merging with the articles on the rollers driven by the belt 33, all of the articles thereon are accelerated to be discharged at a speed of about 180 feet per minute onto the rollers 22 driven by belt 31 which will accelerate the articles to 300 feet per minute.

The rollers of group 22 only extend for a short distance in transporting articles which have been transported by roller group 20. However, the rollers of group 22 continue to drive and accelerate the articles received from roller groups 40 and 41 for an additional time interval to bring them up to the speed necessary to merge with articles which have been transported by rollers of group 20. This is done by the roller groups 22a and 22b which extend between the frame 12a and the short subframes 39 and 39a, respectively. At the end of subframe 39a, the articles being transported over the rollers 22b enter the final transport zone formed by the rollers 24 which are driven to accelerate the articles to 400 feet per minute at which speed they are discharged from the unscrambler.

This construction of the unscrambler provides a means for equalizing the speeds of articles received at very widely, different speeds. In doing so, it has solved the problem of article damage heretofore experienced with equipment of this type when it was attempted to unscramble and accelerate articles of different sizes which enter the equipment at such a wide range of speeds. It also does this without use of internal barriers, instead depending entirely on arranging the rollers in groups the shape and pattern of which keep the articles of different speeds separated until their speeds permit merger. In this connection, it is important that none of the support frames 21, 21a, 21b, 37, 38, 39 and 39a extend above the plane of the tops of the rollers which collectively form the transport surface 11 of the unscrambler, as is illustrated in FIGS. 6 and 7.

One of the benefits of providing groups of rollers arranged in progressively merging transport paths is that of rapidly and dependably orienting the articles not only in single file alignment along one side of the conveyor but also of arranging all of the articles with their longer axis aligned with the direction of transport. This is accomplished not only by the accelerating effect of the higher surface speed of the rollers but also by the fact that the entire transport surface is unobstructed entirely across the conveying surface. Thus, should one end of an article which is not already so aligned come into contact with a roller or rollers driven at one of the slower intermediate speeds, the article will be immediately caused to pivot such that its greater axis will align with the direction of travel over the unscrambler's surface. Because of the high surface speeds of the rollers, this alignment will be accomplished very rapidly. Rapid alignment is very important to the ability to increase the article transport speed of the unit.

In some installations, to avoid the necessity for installation of dual conveyor lines, articles are brought to a central processing station where they are identified for transport to a particular truck dock for loading on skids or pallets and then on trucks for transport to the particular customer facility which ordered them. In some facilities, the articles having been identified are transported at least part of the distance to the appropriate loading dock by the same conveyor. This is possible because in some large warehouse facilities, the articles are removed from storage during certain hours and the trucks are loaded at different hours. Thus, by reversing the direction of the conveyor, the unscrambler can be used to move the articles to the truck loading stations or at least for a significant portion of this distance. When the conveyors are so used, the direction of rotation of the rollers of the unscrambler are reversed and the articles are first received by the rollers 24. In this case, the unit is used as a singulator only and not as a unit for both accelerating and singulating the articles. When so used, the belts 30, 31 and 32 will all be driven at the same speed and the articles will be caused to move toward the side member 12 and become singulated. To effect singulation without significantly retarding their movement over the unscrambler's surface, a belt 50 (FIGS. 1 and 12) driven at a suitable speed, such as 295 feet per minute, is provided along the side of the conveyor surface common to the rollers driven by the belts 30, 31, and 32. The surface of this belt is vertical and overlies the surface of the transport rollers enough to prevent contact between the articles and side of the conveyor. The surface speed of the belt being slightly less than that of the rollers will jostle the articles enough to cause them to singulate by the time they are discharged from the unit. By the time the articles reach the first of the rollers 22, they will have been shifted toward the side member 12 sufficiently to partially or totally avoid contact with the rollers of these groups. However, even if this did not occur, all of the rollers in this area are driven at the same speed and will rapidly move the articles toward the side rail 12 sufficiently that they will not contact the rollers on the other side of the subframes 39 and 39a.

Since the various groups of rollers when used for their primary, that is as a multizone article unscrambler, are driven at different speeds, each group is driven by a separate prime mover (FIG. 1) through an appropriate speed reducer or control (not illustrated). Thus, the belt 30 for the rollers 20 is driven by the prime mover 60. The prime movers 61 and 62 drive the belts 31 and 32. The belts 33 and 34 are driven by the prime movers 53 and 54, respectively. The rollers 24 are driven by the belt 32. Since each of the belts is separately driven by its own prime mover, adjusting their speeds to accomplish a coordinated and efficient movement of articles over the unscrambler can be accomplished relatively easily. Also, when parts of the unit are not used, as when article movement over it is reversed, the drives for the belts 33 and 34 need not be activated. None of these drives are either illustrated or described in detail because their construction and use is well-known in the conveyor field.

Because the rollers of all the groups bias the articles to move toward the frame member 12a, when the rollers are driven to move articles in the direction of the arrow A (FIG. 1), the unscrambler is equipped with angled rail segments 70. These segments are above and overlie the conveying surface and, therefore, engage any articles which get close to the side rail 12a. Normally, these segments are all inclined in the same direction, that is, with their downstream end extending further into the path of articles being moved over the conveyor surface as disclosed in U.S. Pat. No. 4,284,186, issued Aug. 18, 1981, to Brouwer. However, in the present construction, certain ones of them are angled in the opposite direction. These oppositely angled rail segments 71 are designed to accelerate the rotation of elongated articles so that, as they are discharged from the unscrambler, all of them have their greatest dimension aligned in the direction of article travel. These oppositely angled rail segments 71 are designed to accelerate the rotation of articles needing the same to provide uniform axis orientation as the articles leave the unscrambler. This is important because the rate of forward motion of this unscrambler is much greater than that of earlier units. Also, the length of the unscrambler in relation to its operating speed is substantially less. Therefore, it has been necessary to provide means for positively aligning articles very rapidly as they approach and then enter the stream of fully accelerated articles. The reversed orientation of the angled rail segments 71 has been found to be successful in solving this problem.

To reduce noise and facilitate both assembly and service, the elongated shaft supports are used to replace the conventional, single shaft mounts (FIGS. 8-11). To reduce noise, these shaft mounts 80 are molded of a suitable plastic, such as nylon. The result is an elongated, molded strip 81 having a plurality of shaft openings 82 which will seat either the shaft of a single roller or the shafts of a pair of aligned rollers. These are secured to the conveyor frame by suitable fasteners. After the rollers have been placed, the shafts are secured by installing the cap strips 83 which are then secured by suitable fasteners 84 mounted in the openings 85. As will be observed from FIG. 5, the rollers are closely spaced to effect maximum contact with the articles. This is important to enable the rollers to quickly accelerate the articles to the desired speed.

It will be understood from the foregoing that this invention provides a high speed article speed equalizer and singulator of reduced length capable of handling a large quantity of articles without article damaging interference between the articles as they are accelerated and arranged for discharge. It will also be understood that modifications of this invention can be made which are to be considered included in the hereinafter appended claims, unless these claims by their language expressly state otherwise.

We claim:

1. A conveyor for unscrambling and discharging in single file articles received in random order and orientation from side-by-side sources, said conveyor having a pair of parallel side frame members and a plurality of rollers arranged in parallel relationship to each other forming an article transport surface, the central axes of said rollers being parallel and skewed to said side frame members, a plurality of intermediate roller support frames spaced from said side frame members and extending lengthwise to said transport surface, aligned rollers on each side of each of said intermediate frame members, said aligned rollers on each side of said intermediate frame members being separate and independent from the rollers on the opposite side thereof, certain ones of said intermediate frame members being parallel to said side frame members, said intermediate frame members dividing the article transport surface of said conveyor into a plurality of article transport zones with one of said transport zones at the article receiving end of said conveyor having a width which is a minor portion of the total width of said conveyor and means driving the rollers thereof at a higher peripheral speed than that of the rollers forming the remaining portions of article transport surface laterally thereof.

2. A conveyor for unscrambling and discharging in single file articles received in random order and orientation from side-by-side sources, said conveyor having a pair of parallel side frame members and a plurality of rollers arranged in parallel relationship to each other forming an article transport surface, the central axes of said rollers being skewed to the axes of said side frame members, a plurality of intermediate roller support frames spaced from and extending lengthwise to said transport surface, aligned rollers on each side of each of said intermediate frame members, the rollers on each side of said intermediate frame members being separate and independent from the rollers on the opposite side thereof, certain ones of said intermediate frame members being parallel to said side frame members, said intermediate frame members dividing the article receiving end of the article transport surface of said conveyor into a plurality of article transport zones with one of said transport zones at the article receiving end of said conveyor having a width which is a minor portion of the total width of said conveyor and means driving the rollers thereof at a higher peripheral speed than that of the rollers forming the remaining portions of said article transport surface located laterally thereof.

3. The conveyor as described in claim 2 wherein a segment of an intermediate frame is located at the discharge end of said one intermediate frame which segment intersects a plurality of roller axes and is parallel to said side frame members for guiding articles away from articles which have passed over rollers in that portion of the conveyor bed which is on the side of the intermediate frame laterally opposite from said one transport zone.

4. The conveyor as described in claim 2 wherein a plurality of said segments are mounted along the side of said article transport surface supporting the upstream ends of said rollers, each of said segments being individually secured to and supported over said conveyor surface by the adjacent side member of said conveyor, certain ones of said segments being inclined to the adjacent side of said article transport surface so that the ends thereof downstream of the direction of article movement over said surface are spaced further away from the adjacent side of said conveyor than the upstream end thereof, others of said segments being inclined to the adjacent side of said conveyor surface such that the upstream end is furthest away from the adjacent side of said conveyor.

5. The conveyor as described in claim 4 wherein said segments having the downstream end spaced further from said side member are arranged in groups each having a plurality of said segments.

6. The conveyor as described in claim 5 wherein those segments having the downstream end closer to said adjacent side are located between said groups.

7. The conveyor as described in claim 4 wherein those of said segments adjacent the discharge end of said unscrambling conveyor are parallel the adjacent one of said side frame member and seat against it.

8. The conveyor as described in claim 2 wherein individual and separate means are provided to drive each group of rollers on opposite sides of said intermediate roller support frames at different speeds with the speeds of each group being greater than that of the immediately upstream ones thereof for separating articles from each other lengthwise of said conveyor.

9. The conveyor as described in claim 2 wherein all of the rollers one end of which are adjacent the side of said conveyor away from which the articles are moved by the conveyor when it is in forward motion have reversible drive means which when activated will propel the articles thereon toward the end thereof which otherwise would have been the one for article entry to cause the articles thereon to align themselves along said side of said conveyor.

10. A conveyor for unscrambling and discharging in single file articles received in random order and orientation from side-by-side sources, said conveyor having a pair of parallel side frame members and a plurality of rollers all arranged in parallel relationship to each other and forming an article transport surface, the central axes of said rollers being skewed to said side frame members to bias movement of said articles laterally toward one side of said conveyor; an intermediate roller support frame extending lengthwise of said conveyor and spaced from both sides of said conveyor and inclined to the lengthwise axis of the sides of said conveyor and being closest to the adjacent side frame member at the article receiving end of said conveyor to form an article transport path of progressively increasing width away from said article receiving end, a portion of said support frame extending downstream of article movement over said transport surface extending from the receiving end of said support frame generally parallel to the side frame members for directing articles being transported along said transport path laterally away from the path of articles being moved over that portion of said transport surface which is between said support frame and the opposite one of said side frame members.

11. A conveyor for unscrambling and discharging in single file articles received at one end of said conveyor in random order and orientation from side-by-side sources, said conveyor having a pair of parallel side frame members and a plurality of rollers arranged in parallel relationship to each other forming an article transport surface, the central axes of said rollers being skewed to said side frame members, a plurality of intermediate roller support frames spaced from said side frame members and extending lengthwise to said transport surface, aligned rollers on each side of each of said intermediate frame members, said aligned rollers on each side of said intermediate frame members being operatively separate and independent from the rollers on the opposite side thereof, said intermediate frame members dividing the article transport surface of said conveyor into a plurality of article transport zones, a plurality of independent drive means, one for driving the rollers in each article transport zone at a different speed than that of the rollers in each of the other transport zones, one of said transport zones at the article receiving end of said conveyor having a width which is a minor portion of the total width of said conveyor and the rollers thereof being driven at a higher peripheral speed than that of the rollers forming the remaining portions of article transport surface located laterally thereof.

12. The conveyor for unscrambling and discharging in single file randomly received articles described in claim 11 wherein the inclination of the rollers to the side frame members biases the transported articles toward the side of the conveyor initially transporting the slower moving ones of said articles, means for biasing the articles in said one transport zone away from entering the path of articles being moved over aligned rollers on opposite sides of one of said intermediate frame members into the path of articles being propelled at a slower speed until all of the articles being moved over the axis of aligned rollers have attained substantial equality of forward movement.

13. A conveyor as described in claim 10 wherein the side of said conveyor closest to said intermediate roller support frame at the article receiving end thereof has an upstanding belt support extending lengthwise a portion of the length thereof; means for reversing the direction of rotation of all of the rollers forming the article support bed adjacent said one side for transporting articles in a direction opposite to that when the unit is utilized as an unscrambler.

14. A conveyor for unscrambling and discharging in single file articles received at one end of said conveyor as described in claim 11 wherein all of said intermediate frame members being dispersed below the upper surface of said rollers whereby articles can be moved laterally of the transport surface formed by the tops of said rollers.

15. A conveyor for unscrambling and discharging in single file articles received in random order and orientation from plural sources, said conveyor having a pair of parallel side frame members and a plurality of rollers arranged in parallel relationship to each other and at a minor angle to side frame members form an article transport surface, a plurality of intermediate roller support frames spaced from both of said side frame members and extending lengthwise to said transport surface, aligned rollers on each side of each of said intermediate frame members, said aligned rollers on each side of each of said intermediate support frame members being separate and independent from the rollers on the opposite side thereof, said intermediate frame members dividing the article transport surface of said conveyor into a plurality of article transport zones with the rollers in each zone laterally of said conveyor surface being driven at a different peripheral speed, one of said transport zones at the article receiving end of said conveyor having a width which is a minor portion of the total width of said conveyor and means driving the rollers thereof at a higher peripheral speed than that of the rollers forming the remaining portions of article transport surface laterally thereof.

16. A conveyor for unscrambling and discharging in single file articles received in random order and orientation from plural sources as described in claim 15 wherein the surfaces of all of said rollers are in a common plane and the tops of all of said intermediate roller support frames are in a plane below said common plane.

17. A conveyor for unscrambling and discharging in single file articles received in random order and orientation from plural sources as described in claim 15 wherein the articles transported by all of said rollers are caused to align in single file before reaching the discharge end of said article transport surface.

* * * * *